(12) United States Patent
Khan et al.

(10) Patent No.: US 6,288,877 B1
(45) Date of Patent: Sep. 11, 2001

(54) MECHANICAL SUPPORT OF FLEXIBLE CONDUCTORS IN DISK DRIVE SUSPENSIONS

(75) Inventors: Amanullah Khan; Warren Coon, both of Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 0 days.

(21) Appl. No.: 09/195,969

(22) Filed: Nov. 19, 1998

Related U.S. Application Data

(60) Provisional application No. 60/083,962, filed on May 1, 1998.

(51) Int. Cl.[7] ................................................. G11B 5/48
(52) U.S. Cl. ................................. 360/245.9; 360/244.9; 360/245; 360/245.3
(58) Field of Search ..................... 360/245.8, 245.9, 360/245.3, 245.2, 244.3, 97.01, 98.01, 244.9, 245; 361/685, 686; 439/79, 120, 248

(56) References Cited

U.S. PATENT DOCUMENTS

| | | | |
|---|---|---|---|
| 5,572,387 | * 11/1996 | Brooks, Jr. et al. | 360/244.3 |
| 5,612,840 | * 3/1997 | Hiraoka et al. | 360/245.9 |
| 5,680,274 | * 10/1997 | Palmer | 360/245.9 |
| 5,731,931 | * 3/1998 | Goss | 360/245.9 |
| 5,734,526 | * 3/1998 | Symons | 360/244.3 |
| 5,912,787 | * 6/1999 | Khan et al. | 360/245.8 |

* cited by examiner

Primary Examiner—Craig A. Renner
Assistant Examiner—Angel Castro
(74) Attorney, Agent, or Firm—Louis J. Bachand

(57) ABSTRACT

A disk drive suspension is provided comprising a load beam, a flexure partially overlying the load beam, the flexure having frame and tongue for supporting a slider, and a flexible conductor comprising a laminate of conductive leads and insulating plastic film, the flexure load beam-overlying portion and the load beam are fixed together and closely spaced to clamp the flexible conductor in place mechanically and freely of bonding to the load beam or flexure.

15 Claims, 2 Drawing Sheets

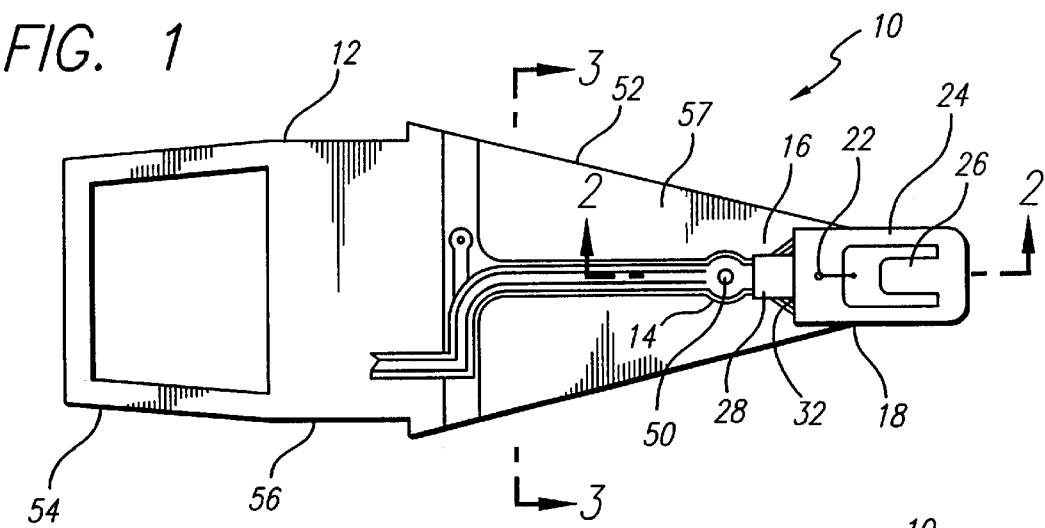
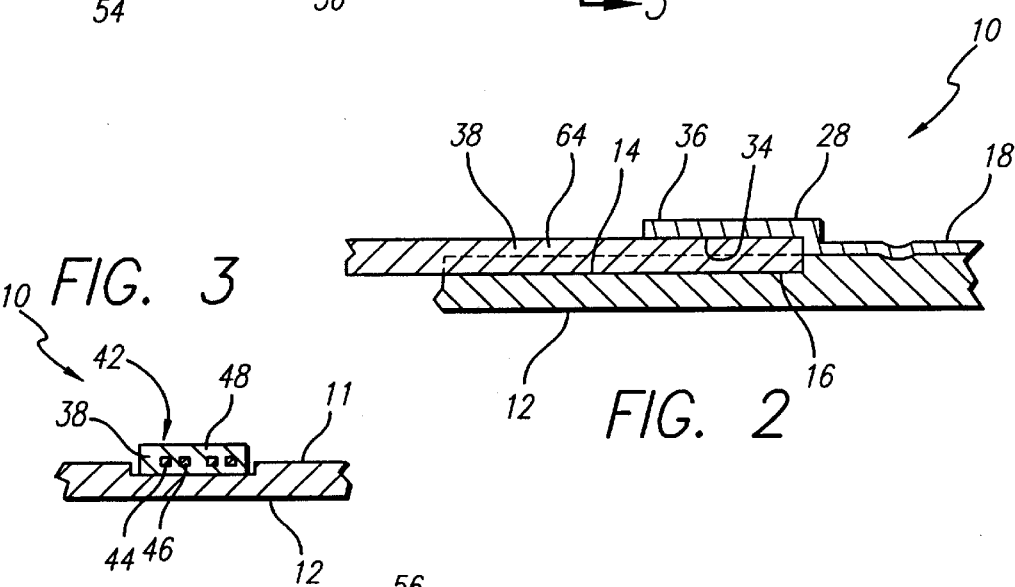
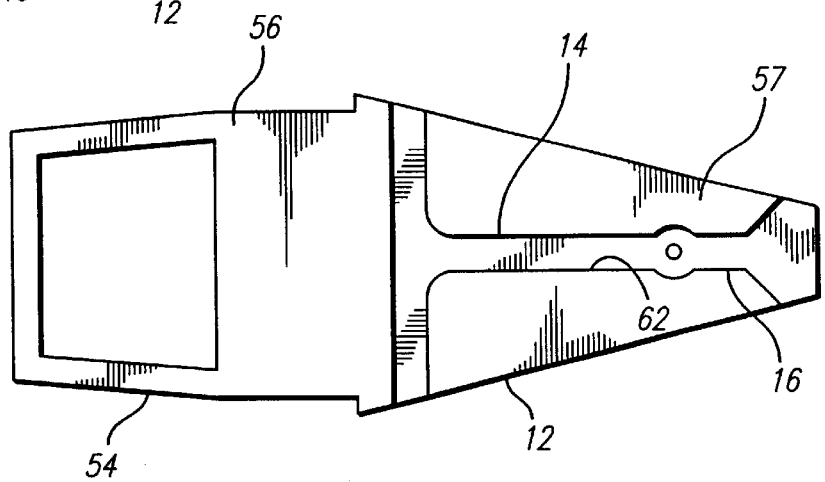

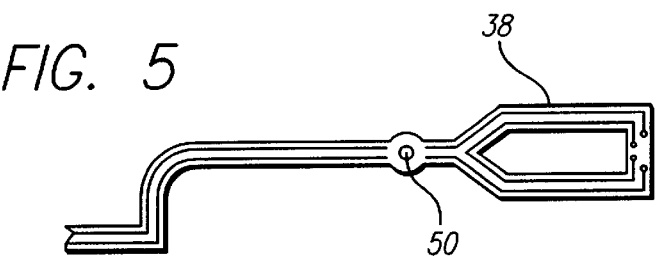
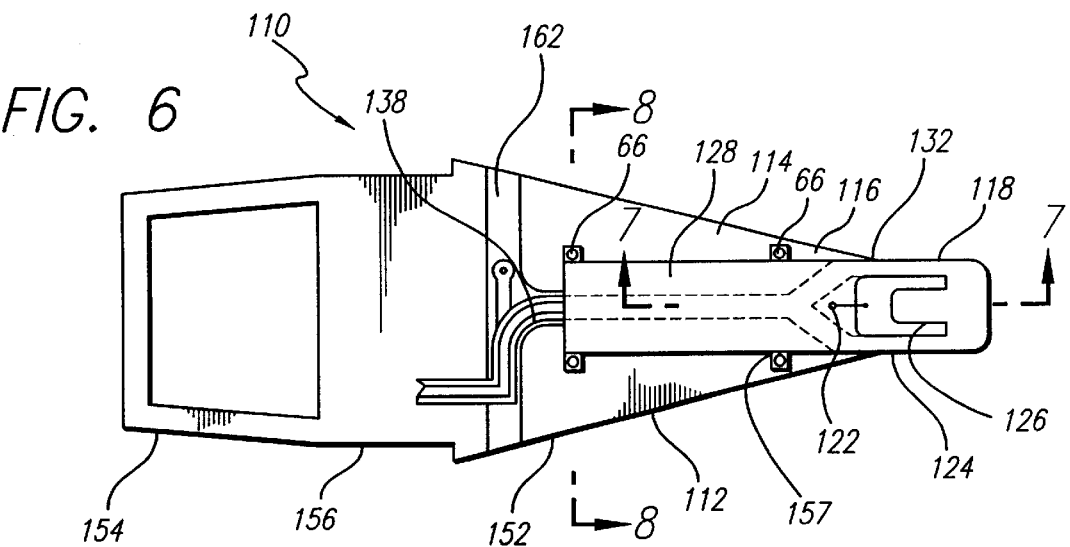
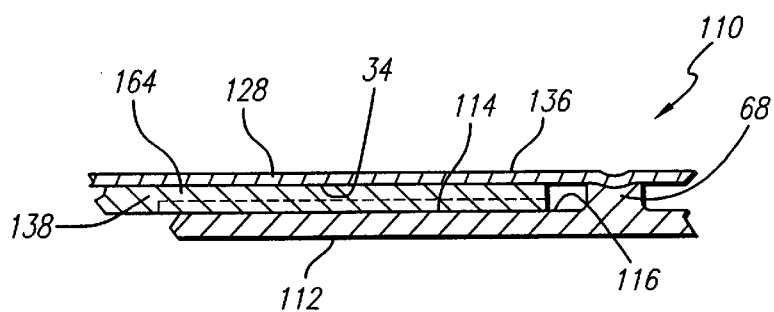
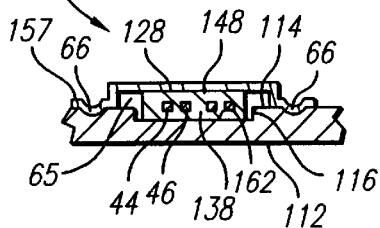

US 6,288,877 B1

MECHANICAL SUPPORT OF FLEXIBLE CONDUCTORS IN DISK DRIVE SUSPENSIONS

RELATED APPLICATIONS

This application claims the benefit of U.S. Provisional Application Ser. No. 60/083962, filed May 1, 1998.

BACKGROUND OF THE INVENTION

1. Technical Field

This invention relates to disk drives and more particularly to disk drive suspensions. In a particular aspect, the invention relates to novel mounting of flexible electrical conductors on suspensions using the flexure and load beam as cooperating clamp members to mechanically support the flexible conductor so as to retain the flexible conductor in place without the use of glues or other bonding expedients.

2. Background Art

The positioning of conductor wires, and of flexible conductors, laminates of conductive layers and plastic film, has been accomplished typically by adhering the conductor in place. This requires precision placement of the flexible conductor in manufacturing to register with the application of the adhesive, is time-consuming and source of defects.

It is known to use twisted wire pairs for electrical connection to the slider in a suspension. In this arrangement very thin copper wires with gold plating are ultrasonically bonded to gold plated pads on the slider to connect the slider to the pre-amp so that the head an perform reading and writing from and to the disk.

The continual diminution in size of sliders increases the effect of unwanted forces and moments from the wires modulating the flying attitude of the slider. Changes in wire length may change wire stiffness. Changes in wire orientation may change the moment on the slider exerted by the wire. Either change will affect flying height, and in the case of large moments and biases, there can be adverse effects on the reliability of the head and recording media.

In place of wires certain supported flexible conductors have been employed; these include a laminate of conductive layers, plastic film and a support backing such as stainless steel. These structures offer the advantage of combining the flexure with the electrical circuit structure. The supported flexible conductors are welded to the load beam and offer both a gimbaling function and conduction of electromagnetic signals. In addition the supported flexible conductors afford electrical connection pads at various desired locations for electrical connection with the slider pads.

For very small sliders, e.g. the 30% or pico-sized slider, the bias of the twisted wire pairs is excessive. Thinner wires also are readily broken and difficult to position for automated manufacturing. The supported flexible conductor while not prone to the problems of twisted wires is problematic because it is easily damaged during device assembly by contact with tooling used to assemble the suspensions each including the load beam, the supported flexible conductor and slider into head gimbal assemblies (HGA's). The HGA is attached to the E-block, e.g. by swaging, To keep the several sliders apart wedge-shaped comb structures are inserted between the HGA's. These wedges may damage the supported flexible conductors in place on the load beams. Cleaning of the HGA may also result in damaging contact with the supported flexible conductors, and generate contamination. Also, HGA merging into the disk packs requires use of the wedge-shaped combs affording a further opportunity for physical damage to the supported physical conductors.

SUMMARY OF THE INVENTION

The use of unsupported flexible conductors avoids many of these problems and is frequently the conductor of choice. The process of bonding these flexible conductors in place on the load beam, as by gluing, requires the use of organic glues with their attendant off-gasses, and precise positioning of both glue and conductor. Neither requirement is desirable in a manufacturing process. Further the flexible conductor is desirably shielded from damage from the comb wedges. Also, flatness of the flexible conductor must be ensured to avoid introducing a new source of bias on the head.

It is an object, therefore, of the present invention to provide a glue-less mode of support for flexible conductor on a load beam. It is a further object to provide a method of supporting a flexible conductor on a load beam in which the flexible conductor is protected from damage from comb wedges during assembly operations. It is a further object to provide a mechanical support for the flexible conductor defined by already present components of the suspension. In particular it is an object of the invention to provide opposing first and second clamp members defined by the flexure and the load beam respectively arranged to mechanically support the flexible conductor in position by simply wedging the conductor between the flexure, which is welded onto the load beam in a manner allowing a gap between the flexure body, and the opposing load beam other than at the point of their weld attachment. It is a further object to afford mechanical protection for the flexible conductor in place from combs and other intrusive mechanisms by recessing or covering the flexible conductor in its locus between the flexure and the load beam.

These and other objects of the invention to become apparent hereinafter are realized in a disk drive suspension comprising a load beam having a portion defining a first clamp member, a flexure fixed to the load beam, the flexure having a load beam-overlying portion defining a second clamp member adapted to cooperate with the first clamp member in clamping relation, and a flexible conductor comprising a laminate of conductive leads and insulating plastic film, the flexible conductor being disposed on the load beam portion and clamped there by the cooperating first and second clamp members.

In this and like embodiments, typically, solely the first and second clamp members support the flexible conductor in its disposition on the load beam portion; the load beam portion is a beam portion, the load beam further having a base portion and a spring portion arranged to support the beam portion, the beam portion having a surface opposite the flexure portion, the flexure having a plurality of circumferentially located tabs arranged to support the flexure on the load beam portion surface in spaced relation; the load beam portion is a beam portion, the load beam further having a base portion and a spring portion arranged to support the beam portion, the beam portion having a surface opposite the flexure portion, the beam portion surface being locally relieved in flexible conductor receiving relation; the reception of the flexible conductor by the relieved beam portion surface reduces the portion of the flexible conductor projecting beyond the beam portion surface; the load beam portion is a beam portion, the load beam further having a base portion and a spring portion arranged to support the beam portion, the beam portion having a surface opposite the flexure load beam-overlying portion, the beam portion surface defining a boss extending from the beam portion surface toward the flexure portion a predetermined height, the flexible conductor disposed on the beam portion having a height less than the boss predetermined height, the flexure load beam-overlying portion being secured to the load beam at the boss in flexible conductor clamping relation in cooperation with the load beam portion first clamp member; the flexure is welded to the load beam; and/or the suspension is free of bonding attachment between the flexible conductor and the flexure or the load beam at the flexure load beam-overlying portion.

In a further embodiment, the invention provides a disk drive suspension comprising a spring metal load beam, a spring metal flexure having a tongue, a frame about the tongue and a frame extension, the flexure frame extension being fixed to the load beam, the flexure frame extension having a load beam-overlying portion, and a flexible conductor comprising a laminate of conductive leads and insulating plastic film, the flexible conductor being disposed on the load beam, the flexure frame extension load beam-overlying portion and the load beam cooperating to retained the flexible conductor in its the disposition.

In this and like embodiments, typically, the flexible conductor has a given height, the load beam portion is a beam portion, the load beam further has a base portion and a spring portion supporting the beam portion, the beam portion having a surface, the beam portion surface being locally relieved in flexible conductor receiving relation opposite the flexure flame extension load beam-overlying portion; the flexure frame extension has a plurality of circumferentially located tabs adapted to support the flexure in spaced relation to the beam portion surface in flexible conductor sandwiching relation; the beam portion surface is locally relieved to a depth to fully receive the flexible conductor given height; the flexible conductor has a given height, the load beam beam portion has a surface defining an upstanding boss extending a height from the beam portion surface greater than the flexible conductor given height to accommodate the flexible conductor below the top of the boss, the flexure frame extension load beam-overlying portion being fixed to the load beam at the boss in flexible conductor retaining relation in cooperation with the beam portion; the flexure frame extension load beam-overlying portion is welded to the load beam boss; the suspension is free of bonding attachment between the flexible conductor and the flexure or the load beam at the flexure frame extension load beam-overlying portion; and/or the suspension is free of bonding attachment to the flexible conductor except at the flexure frame adjacent the tongue.

In a still further embodiment, the invention provides a disk drive suspension comprising an axially elongated spring metal load beam having a base portion, a spring portion and a beam portion, and an axially elongated spring metal flexure generally parallel to and at least partially overlying the load beam beam portion, the flexure having a tongue, a frame about the tongue and a frame extension extending rearwardly from the frame generally in parallel with the load beam to define the portion of the flexure overlying the load beam, and a flexible conductor comprising a laminate of conductive leads and insulating plastic film, the flexible conductor lying against and generally axially of the load beam beam portion and extending to the flexure frame, the flexure load beam-overlying portion and the load beam being fixed together and closely spaced to form a flexible conductor receiving pocket sized to trap the flexible conductor between the load beam and flexure load beam overlying portion, whereby the flexible conductor is retained against the load beam freely of bonding to the load beam or the flexure opposite the load beam.

THE DRAWINGS

The invention will be further described as to an illustrative embodiment in conjunction with the attached drawings in which:

FIG. 1 is a top plan view of a first embodiment of the suspension according to the invention;

FIG. 2 is a view taken on line 2—2 in FIG. 1;

FIG. 3 is a view taken on line 3—3 in FIG. 1;

FIG. 4 is a top plan view of the load beam shown in FIG. 1;

FIG. 5 is a top plan view of the flexible conductor shown in FIG. 1;

FIG. 6 is a view like FIG. 1 of a second embodiment according to the invention;

FIG. 7 is a view taken on line 7—7 in FIG. 6; and,

FIG. 8 is a view taken on line 8—8 in FIG. 6.

DETAILED DESCRIPTION

The present invention clamps rather than bonds the unsupported flexible conductor to the load beam, thereby avoiding gluing, adhering, or otherwise bonding the flexible conductor to the load beam. The invention assembly avoids those manufacturing steps necessary to perform bonding operations. The potentially damaging chemicals used in bonding are avoided. Also avoided are critical placement procedures with thin, breakable wires and the expense of steel-containing conductive laminates. The clamping of the flexible conductor according to the invention uses parts already available, namely the load beam and the flexure. These parts are juxtaposed in somewhat their usual manner, but the parts define clamp members and the flexible conductor is placed between them and retained there without bonding steps or chemicals as an improved manufacturing assembly step.

The flexible conductor is sandwiched between the load beam and the flexure so that no gluing is required to maintain it in place. Locating the flexible conductor in manufacturing according to the invention involves use of a tooling hole and/or a partial etch of the load beam. Space for the flexible conductor height is found by etching the load beam to at least partially receive the flexible conductor, lifting the flexure from the load beam with circumferentially placed tabs on the flexure frame, and/or creating a boss rising from the load beam surface, to which the flexure is to be attached, to make space for the flexible conductor. All these assembly alternatives provide protection for the flexible conductor during subsequent manufacturing such as head stack assembly by keeping the flexible conductor from contact with the suspension separating combs used in such assembly.

With reference now to the drawings in detail, in FIGS. 1 to 4 the invention disk drive suspension is shown at 10. Suspension 10 comprises a load beam 12 having a portion 14 defining a first clamp member 16. Suspension 10 further comprises a flexure 18 fixed to the load beam 12, typically by welding the flexure and load beam together at 22. The flexure 18 comprises an interiorly open frame 24 from which tongue 26 is cantilevered in the usual manner to support a slider (not shown) above a disk (not shown). Flexure 18 has a further portion 28 extending rearwardly from the frame perimeter 32, and generally rectangular and integrally formed with the flexure frame 24. Flexure portion 28 overlies the load beam at locus 34 and defines a second clamp member 36 opposite to and complementary with the first clamp member 16 defined by load beam portion 14. Flexure portion 28 and the second clamp member 36 defined thereby is shaped, positioned and otherwise adapted, as shown, to cooperate with the load beam first clamp member 16 to clamp material between them, that is to cooperate in clamping relation, specifically binding in place by friction the flexible conductor 38 so as to hold the flexible conductor in place in locus 34.

Flexible conductor 38, best shown in FIGS. 3 and 5, comprises a laminate 42 of conductive leads 44, 46 and an insulating plastic film 48 and provides the electrical connection between the suspension pre-amp and slider (not shown). Flexible conductor 38 is typically free of the supporting stainless steel member found in self-supporting flexible conductors. The flexible conductor 38 is disposed on the load beam portion 14 and clamped there by the cooperating first and second clamp members 16, 36, as shown.

Typically, solely the first and second clamp members 16, 36 support the flexible conductor 38 in its disposition on the load beam portion 14. Flexible conductor 38 support is therefore mechanical; there is no chemical or nonmechanical, or other support, such as adhesive. Thus the problems of chemical adhesives are avoided. The flexible conductor 38 is apertured at 50 for positioning on the load beam.

The load beam portion 14 is formed of spring metal and comprises for the most part the beam portion 52 of the load beam 12. Load beam 12 further has a base portion 54 and a spring portion 56 integral with the beam portion 52 and arranged in the usual manner to support the beam portion in cantilevered relation over a disk (not shown). The load beam portion 14 (or 52) has a surface 57 opposite the flexure portion 28. With particular reference to FIGS. 1–5, the beam portion surface 57 is desirably locally relieved with channel 62 sized and shaped for receiving, at least partially, the flexible conductor 38. Reception of the flexible conductor 38 by the channel 62 reduces the portion 64 of the flexible conductor 38 projecting above or beyond the beam portion surface 57, lowering its profile and thus its likelihood of damaging contact with combs being used in HGA and stack assembly operations.

With particular reference to FIGS. 6–8, in which like parts have the same number as in FIGS. 1–5, with the addition of 100, another embodiment is shown in which load beam 112 is fixed to the flexure 118 at weld point 122. Flexure 118 has a further portion 128 extending rearwardly from the flexure frame perimeter 132. Flexure further portion 128 is more extended than further portion 28 in the earlier embodiment and extends a greater distance over the flexible conductor 138 in protective relation to the conductor. To ensure adequate spacing 65 between the flexure further portion 128 and the opposing load beam surface 157, the portion 128 is provided with a series of perimetrically spaced tabs 66 which define standoffs for the flexure further portion 128 and maintain the desired spacing.

In addition, in conjunction with the tabs 66, or as an alternative thereto, the load beam 112 is provided with a boss 68 suitably formed integrally with the load beam, such as by an upset along the load beam length, or otherwise as by adding a separately formed boss. Boss 68 serves to define the spacing between the flexure further portion 128 and the load beam 112 per se so as to accommodate the projecting height 164 of the flexible conductor 138. As in the previous embodiment, the load beam 112 is provided with channel 162 to receive the flexible conductor 138.

The present invention thus provides a glue-less mode of support for flexible conductor on a load beam. The flexible conductor is protected from damage from comb wedges during assembly operations and is supported by members defined by already present components of the suspension, in the form of opposing first and second clamp members defined by the flexure and the load beam respectively arranged to mechanically support the flexible conductor in position by simply wedging the conductor between the flexure. The flexure is welded onto the load beam allowing a gap between the flexure body, and the opposing load beam other than at the point of their weld attachment.

The foregoing objects are thus met.

I claim:

1. A disk drive suspension comprising a load beam having a portion defining a first clamp member, a flexure having a distal end and a proximal end, said flexure distal end being fixed to said load beam, said flexure proximal end being free of attachment to and spaced from said load beam a given distance, said flexure having a load beam-overlying portion including said proximal end and defining a second clamp member adapted to cooperate with said first clamp member in clamping relation, and a flexible conductor having a thickness no greater than said given distance, said flexible conductor comprising a laminate of conductive leads and insulating plastic film, said flexible conductor being disposed on said load beam portion between said flexure and said load beam and clamped there by said cooperating first and second clamp members and free of bonding attachment to said flexure and said load beam at said load beam-overlying flexure portion.

2. The disk drive suspension according to claim 1, in which solely said first and second clamp members support said flexible conductor in its disposition on said load beam portion.

3. The disk drive suspension according to claim 1, in which said load beam portion is a beam portion, said load beam further having a base portion and a spring portion arranged to support said beam portion, said beam portion having a surface opposite said flexure portion, said flexure having a plurality of circumferentially located tabs formed distally of said flexure proximal end that support said flexure on said load beam portion surface in spaced relation at said given distance.

4. The disk drive suspension according to claim 1, in which said load beam portion is a beam portion, said load beam further having a base portion and a spring portion arranged to support said beam portion, said beam portion having a surface opposite said flexure portion, said beam portion surface being locally relieved in flexible conductor receiving relation.

5. The disk drive suspension according to claim 4, in which reception of said flexible conductor by said relieved beam portion surface reduces the portion of said flexible conductor projecting beyond said beam portion surface.

6. The disk drive suspension according to claim 1, in which said load beam portion is a beam portion, said load beam further having a base portion and a spring portion arranged to support said beam portion, said beam portion having a surface opposite said flexure load beam-overlying portion spaced at said given distance, said flexure terminating distally in an open frame and tongue structure, said beam portion surface defining a boss opposite said flexure and located rearwardly of said flexure open frame and tongue structure and extending from said beam portion surface toward said flexure portion a predetermined height not greater than said given distance, said flexible conductor disposed on said beam portion having a height less than said boss predetermined height, said flexure load beam-overlying portion being secured to said load beam at said boss in flexible conductor clamping relation in cooperation with said load beam portion first clamp member.

7. The disk drive according to claim 1, in which said flexure is welded to said load beam.

8. A disk drive suspension comprising a spring metal load beam, a spring metal flexure having a distal end and a proximal end, said flexure having a tongue, a frame about said tongue and at its proximal end a frame extension extending rearwardly from said flexure distal end, said flexure frame distal end being fixed to said load beam, said flexure frame extension having a proximal, cantilevered, load beam-overlying portion, and a flexible conductor having a given thickness and comprising a laminate of conductive leads and insulating plastic film, said flexible conductor being disposed on said load beam, said flexure frame extension load beam-overlying portion and said load beam being spaced a given distance not less than said given thickness for the length of said flexure frame extension portion, said flexure portion and said load beam cooperating to retain said flexible conductor as disposed on said load beam, said flexible conductor being free of bonding attachment to said flexure and said load beam at said flexure frame extension portion.

9. The disk drive suspension according to claim 8, in which said beam portion has a surface, said beam portion surface being locally relieved in flexible conductor receiving relation opposite said flexure frame extension portion.

10. The disk drive suspension according to claim 9, in which said flexure frame extension has a plurality of circumferentially located tabs adapted to support said flexure in said given spaced relation to said beam portion surface in flexible conductor sandwiching relation.

11. The disk drive suspension according to claim 10, in which said beam portion surface is locally relieved to a depth to fully receive said flexible conductor given height.

12. The disk drive suspension according to claim 9, in which said suspension is free of bonding attachment to said flexible conductor except at said flexure frame adjacent said tongue.

13. The disk drive suspension according to claim 8, in which said load beam portion opposite said frame extension portion has a surface defining an upstanding boss extending a distance from said beam portion surface not greater than said flexible conductor given thickness to accommodate said flexible conductor below the top of said boss, said flexure frame extension portion being fixed to said load beam at said boss in flexible conductor retaining relation in cooperation with said beam portion.

14. The disk drive suspension according to claim 13, in which said flexure frame extension portion is welded to said load beam boss.

15. A disk drive suspension comprising an axially elongated spring metal load beam having a base portion, a spring portion and a beam portion, and an axially elongated spring metal flexure generally parallel to and at least partially overlying said beam portion, said flexure having a proximal end and a distal end, said flexure having a tongue, a frame about said tongue and a frame extension extending rearwardly from said frame generally in parallel with said load beam and spaced therefrom a given distance to define a frame extension portion of said flexure overlying said load beam, and a flexible conductor of a given thickness and comprising a laminate of conductive leads and insulating plastic film, said flexible conductor lying against and generally axially of said beam portion and extending to salad flexure frame, said frame extension portion and said load beam given distance spacing being sized to receive said thickness of said flexible conductor and trap said flexible conductor between said load beam and flexure frame extension portion without reducing said flexible conductor given thickness, whereby said flexible conductor is retained against said load beam freely of bonding to said load beam or said flexure frame extension.

* * * * *